M. Wesson,
Surcingle.
No. 97,574.                    Patented Dec. 7, 1869.
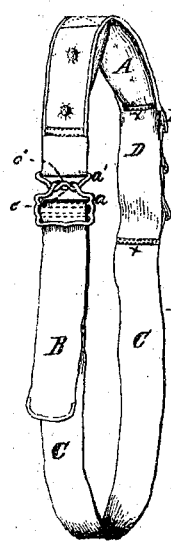
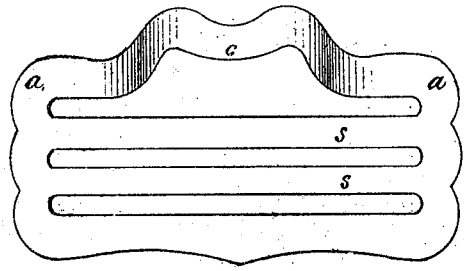
Witnesses: J. A. Curtis
W. F. Hall
Inventor:
Martin Wesson

United States Patent Office.

MARTIN WESSON, OF SPRINGFIELD, MASSACHUSETTS.

Letters Patent No. 97,574, dated December 7, 1869.

IMPROVED SURCINGLE.

The Schedule referred to in these Letters Patent and making part of the same.

*To all whom it may concern:*

Be it known that I, MARTIN WESSON, of Springfield, in the county of Hampden, and State of Massachusetts, have invented a new and useful Improved Surcingle; and I do hereby declare the following, when taken in connection with the accompanying drawings, and the letters of reference marked thereon, to be a full, clear, and exact description thereof, and which said drawings constitute part of this specification, and represent, in—

Figure 1, a perspective view of a surcingle, with my invention applied.

Figure 2 is a top view of the lower part of the clasp.

Figure 3 is an end view of the same.

Figure 4 is a view of the under side of the upper part of the clasp, as it stands in fig. 1.

Figure 5 is an end view of the same.

Figure 6 is an outside view of the surcingle, at the part where the elastic material is attached, and Figure 7 is a front view of the lower part of the clasp.

My invention relates to the surcingle used for securing blankets or coverings to horses; and It consists, in connection with a clasp, of making the same adjustable to horses, by attaching a piece of elastic material, of suitable length, upon the inside, and gathering a greater length of the surcingle in folds upon the outside of the elastic material, each end of the elastic material being secured to the surcingle, so that its whole length may vary, and adapt itself to the size of the horse at different times, according as his fullness or size may vary; and It consists, in connection with this elastic feature, of a clasp, made in two parts, one of which is secured to the said surcingle, so that it may be moved to and fro thereon, as may be desirable, to change the length of the surcingle to suit different-sized horses, by simply loosening the loop.

It is well known that the size of a horse changes very considerably in the course of a day, and changes also according as he changes position, whether lying down or standing, and oftentimes, in his efforts to rise, his size increases to such an extent as to break the buckle, or the strap to which it is sewed.

This change in the size of a horse is sometimes so considerable that those persons who look carefully to the comfort and health of the animal, generally make several changes in the size of the surcingle during the day, when it is worn, making it tighter or looser by the buckle and strap, as the case may be.

If this is not attended to properly, and the surcingle is allowed to get too loose, the covering often gets loose, and under the feet of the horse, and is soiled or torn.

My invention is designed to obviate this trouble, as, after being once secured, the surcingle will remain until it is removed, while it is sufficiently elastic to be comfortable and easy for the horse.

That others skilled in the art may be able to make and use my improvement, I will proceed to describe its construction and operation.

In the drawings—

C represents the band or main part of the surcingle, and the upper part is padded at A, that it may the more perfectly fit the horse.

At any convenient place, I gather the band into folds, E, and upon the inside of these folds, I place a piece of elastic material, D, sufficiently long to cover the folds, and I secure each end of this elastic material to the band, at $x\ x$.

To one end of the surcingle, I attach an open frame or portion of a clasp, $a'$, having a straight horizontal bar at the top, the sides of said frame extending downward and inward until near the centre, when they extend upward and meet, forming a hook or point, $c'$, as seen in fig. 5.

The lower frame, or other part of the clasp $a$, may be rectangular in form, and having two horizontal bars extending from one side of the frame to the other, or from one end to the other, as shown in dotted lines in fig. 1.

The top of said frame $a$ extends upward and inward, until near the centre, when it extends downward and meets, forming a hook or point, $c$, as shown in fig. 3.

The point $c'$, upon the upper frame of the clasp $a'$, is bent outward, as shown in fig. 5, while the corresponding point or hook $a$, upon the lower frame of the clasp, is bent inward, as shown in fig. 3.

The upper frame $a'$, of the clasp, may be secured rigidly to the surcingle, but the lower frame may be secured by passing the end B in between the lower side of the frame and the first or lowest bars, and then in between the two bars, over and around the upper bar $s'$, and thence back between the lower side of the frame and the first bar $s$, as shown more fully in fig. 3.

If it is desired to lengthen the surcingle, it may be done by simply pulling out the end B, when the frame $a$ may be moved nearer the end of the band.

The frame $a$ will remain where it is placed upon the band, as the end B is confined and prevented from slipping by the band C.

I may either gather the greater length of the surcingle, upon the outside of the elastic material, into folds, as shown in the drawings, and attach it at different points to the elastic material, or I may let it hang loose. I prefer, however, that it should be gathered in folds, as it is then out of the way.

I may make the lower frame $a$ with more than two bars, but two is quite sufficient to secure it; and the principle of fastening would be precisely similar to that herein described.

I am aware that elastic material has been attached to surcingles, for the purpose of making them adjustable, in a similar manner to that herein described, and I do not claim the same as a separate feature; but having described my invention, What I do claim as new, and desire to secure by Letters Patent, is—

An improved surcingle, consisting of the main web C, the elastic web D, and the clasp $a\ a'$, all constructed and operating substantially as and for the purpose herein described.

MARTIN WESSON.

Witnesses:
T. A. CURTIS,
W. F. HALL.